United States Patent
Schiel et al.

[19]

[11] Patent Number: 6,116,156
[45] Date of Patent: Sep. 12, 2000

[54] MACHINE FOR PRODUCING A CONTINUOUS MATERIAL WEB

[75] Inventors: Christian Schiel, Murnau; Karlheinz Straub, Heidenheim, both of Germany

[73] Assignee: Voith Sulzer Papiermaschinen GmbH, Heidenheim, Germany

[21] Appl. No.: 09/110,016

[22] Filed: Jul. 2, 1998

[30] Foreign Application Priority Data

Jul. 3, 1997 [DE] Germany .......................... 197 28 399

[51] Int. Cl.$^7$ ................................ B30B 5/04; B30B 9/24
[52] U.S. Cl. .................... 100/118; 100/153; 100/172; 162/348; 162/358.2; 162/900; 162/901; 162/902; 162/903; 474/266; 474/267
[58] Field of Search ..................... 100/118, 151, 100/153, 172, 173; 162/348, 358.2, 900–903; 474/266, 267

[56] References Cited

U.S. PATENT DOCUMENTS

| 502,041 | 7/1893 | Jacoby | 474/266 |
|---|---|---|---|
| 823,892 | 6/1906 | Parkes | 474/267 |
| 1,492,630 | 5/1924 | Fisher | 474/266 |
| 3,523,867 | 8/1970 | MacBean | 162/348 |
| 4,452,284 | 6/1984 | Eckstein et al. | 162/348 |
| 4,460,023 | 7/1984 | Mullaney | 162/902 |
| 4,707,260 | 11/1987 | Nagayama et al. | 100/118 |
| 5,084,326 | 1/1992 | Vöhringer . | |
| 5,360,518 | 11/1994 | McCarthy et al. . | |
| 5,397,438 | 3/1995 | Nyberg et al. | 162/902 |
| 5,422,166 | 6/1995 | Fleischer . | |
| 5,508,094 | 4/1996 | McCarthy et al. . | |
| 5,731,059 | 3/1998 | Smith et al. | 162/902 |

FOREIGN PATENT DOCUMENTS

| 29157 | 12/1987 | Australia . |
|---|---|---|
| 0152137 | 8/1987 | European Pat. Off. . |
| 0388601 | 9/1990 | European Pat. Off. . |
| 0704572 | 4/1996 | European Pat. Off. . |
| 4012421 | 10/1991 | Germany . |
| 672096 | 5/1952 | United Kingdom . |
| 1117953 | 6/1968 | United Kingdom . |

*Primary Examiner*—Stephen F. Gerrity
*Attorney, Agent, or Firm*—Greenblum & Bernstein, P.L.C.

[57] ABSTRACT

A machine is provided for producing a continuous material web. In particular, a paper web or a cardboard web can be produced by the machine. The machine has a number of rolls, around which the material web is guided by the use of at least one belt. The belt has at least two zones. The zones have different properties with at least one of the zones being designed to transmit a drive force to the rolls of the machine.

24 Claims, 3 Drawing Sheets

MACHINE FOR PRODUCING A CONTINUOUS MATERIAL WEB

CROSS-REFERENCE OF RELATED APPLICATION

The present invention claims the priority under 35 U.S.C. § 119 of German Patent Application No. 197 28 399.3 filed in Germany on Jul. 3, 1997, the disclosure of which is expressly incorporated by reference herein in its entirety.

BACKGROUND OF THE INVENTION

1. Field of the Invention

The invention relates to a machine for producing a continuous material web, as well as a belt for use in such a machine.

2. Discussion of Background Information

Machines and belts of the type discussed here are known. In known machines of this type, for example paper machines, the drive is effected in different manners in different sections, for example, in forming, press and/or drying sections. It is possible, for example, to set (drying) screens and felts into motion by using several driven rolls. It is possible thereby to connect drive devices, that is, motors or the like, directly to the rolls, or by way of gears. A disadvantage of using gears is the high noise level. A further option is to drive the rolls by way of pulleys mounted to the end faces. In this case, a motor can also set several rolls in rotation.

It is also possible to couple several rolls or drying cylinders of a group to one another by way of toothed wheels, and to use, for example, one motor per group. While this solution provides good synchronization, it is associated with a sustained high noise level. The costs to produce the machine drive also increase.

Another observed drawback is that the belts forming an endless loop and having a circumference of 20 to 30 m or more, for example, must absorb the entire drive force, and are subjected to expansion. This has a negative impact on the production of the material web. It is possible that the material web, for example a paper web, be correspondingly expanded as the belt expands, or relative movements may occur between the belt and the material web. Both phenomena adversely affect the properties of the material web. It is possible to reduce these negative influences by using several drives for one belt. This approach, however, increases the costs for the machine. In addition, it is necessary to employ control and/or regulating devices for attaining an exact match of speeds between the drives.

Particularly early on, belt drives were also realized; these, however, were distinguished by large spatial requirements due to the necessary protective covers. Furthermore, the accessibility to the machine is impeded especially when several rolls are driven by way of transmission belts.

SUMMARY OF THE INVENTION

It is therefore an object of the invention to provide a machine for producing a continuous material web, as well as a belt for use in such a machine, in which the aforementioned disadvantages are reduced to a minimum, or completely prevented wherever possible.

To accomplish this object, a machine is provided which possesses features in which the width of the belt encompasses at least two zones having different properties. Thus, it is possible to provide at least one zone that is particularly designed for transmitting drive forces to the rolls. Another zone can then be adapted to the material web. No additional drive mechanism need be provided. At the same time, it is ensured that the special design of the zone intended for transmitting drive forces avoids an expansion of the belt due to forces occurring during the operation of the machine. This prevents an expansion of the material web that is guided with the belt through the machine, or the occurrence of relative movements between the material web and the belt that have a negative impact on the properties of the material web. It is also possible to embody a drive for the machine in a simple manner without the aforementioned disadvantages appearing.

An embodiment of the machine is preferred, wherein the zone intended for transmitting drive forces lies outside of the belt region on which the material web is guided. This is realized in that the width of the belt is adapted to the width of the material web such that the zone serving to transmit drive forces preferably does not touch the material web. In this way, the belt properties can be optimally adapted to the respective function: in the contact region with the material web, the belt is selected such that the material web is not affected adversely in any way. The zone disposed outside of the region of the material web can be specially designed for transmitting drive forces so as to preclude negative impacts on the properties of the material web.

To accomplish the established object, a belt is also proposed, which is distinguished by the fact that it is equipped over its width with at least two zones having different properties, with at least one zone being designed to transmit drive forces to the rolls.

A further object of the present invention is to provide a machine for producing a continuous material web, particularly a paper or cardboard web, having a number of rolls, around which the material web is guided with at least one belt, in the machine, the belt is provided with at least two zones, the zones have different properties with at least one of the zones being designed to transmit drive forces to the rolls.

Another object of the invention is to provide a machine wherein the zones that transmit drive forces are at an edge region of the belt.

Another object of the invention is to provide a machine wherein the belt includes three zones of which two edge zones transmit drive forces.

An additional object of the invention is to prevent a machine wherein a width of the belt corresponds to the width of the material web such that the zone to transmit drive forces is located outside of a region in which the material web contacts the belt.

Another object of the present invention is to provide a belt wherein the zones that transmit driving forces are comprised of a material possessing high tensile strength.

Another object of the invention is to provide a machine for producing a continuous material web in which the belt comprises a fabric in which, the zone to transmit driving forces contains substantially more threads/fibers extending in a run direction of the belt than in a transverse direction of the belt.

A further object of the invention is to provide at least one surface of the zone to transmit drive forces composed of a material possessing a high coefficient of friction.

Another object of the invention is to provide the rolls of the machine with surfaces that cooperate with the zone to transmit drive forces composed of a material possessing a high coeffecient of friction.

Another object of the invention is to provide a machine wherein the zone to transmit drive forces is one of a roughened zone and a zone provided with projections/depressions that cooperate with depressions/projections provided on the rolls.

Another object of the invention is to provide a machine wherein the zone to transmit drive forces is constructed separately from a center zone of the belt.

An additional object of the invention is to provide a belt which is used in the machine for producing a material web, particularly a paper or cardboard web, having a number of rolls, around which the material web is guided together with the belt. The belt has at least two zones across a width of the belt and the zones have different properties, with at least one of the zones transmitting drive forces to the rolls.

Another object of the present invention is to provide a belt wherein the zone for transmission of drive is located at an edge of the belt. This aspect of the invention encompasses a belt which has three zones of which two edge zones are provided for transmitting drive forces.

Another object of the invention is to provide a belt wherein a width of the belt corresponds to a width of the material web so that the zone to transmit drive forces is located outside of a region in which the material web contacts the belt.

A further object of the invention is to provide a belt wherein the zone to transmit drive forces comprises a material possessing a high tensile strength.

An additional object of the invention is to provide a belt wherein the belt is made of a fabric material which, in the zone to transmit drive forces, contains substantially more threads/fibers extending in a run direction of the belt than in a transverse direction of the belt.

Another object of the invention is to provide at least one surface of the zone for transmitting drive to comprise a material having a high coefficient of friction.

The belt may also cooperate with rolls wherein surfaces of the rolls comprise, at least in some regions, a material possessing a high coefficient of friction.

Another object of the invention also provides for the zones that transmit drive forces to be either roughened and/or provided with projections/depressions that cooperate with depressions/projections on the rolls.

Other objects of the invention include providing the belt as a spring belt, a felt, a drying sieve or providing the belt as a pressed jacket.

DETAILED DESCRIPTION OF THE DRAWINGS

The present invention is further described in the detailed description which follows, in reference to the noted drawings by way of non-limiting examples of preferred embodiments of the present invention, wherein the same reference numerals represent similar parts throughout the several views of the drawings, and wherein.

DETAILED DESCRIPTION OF THE PREFERRED EMBODIMENTS

The particulars shown herein are by way of example and for purposes of illustrative discussion of the preferred embodiments of the present invention only and are presented in the cause of providing what is believed to be the most useful and readily understood description of the principle and conceptual aspects of the invention. In this regard, no attempt is made to show structural details of the invention in more detail than is necessary for the fundamental understanding of the invention, the description taken with the drawings making apparent to those skilled in the art how the several forms of the invention may be embodied in practice.

Hereinafter it is assumed, strictly by way of example, that the machine for producing a material web is a paper-producing machine, and that the belt is used in such a machine.

Figure 1A:
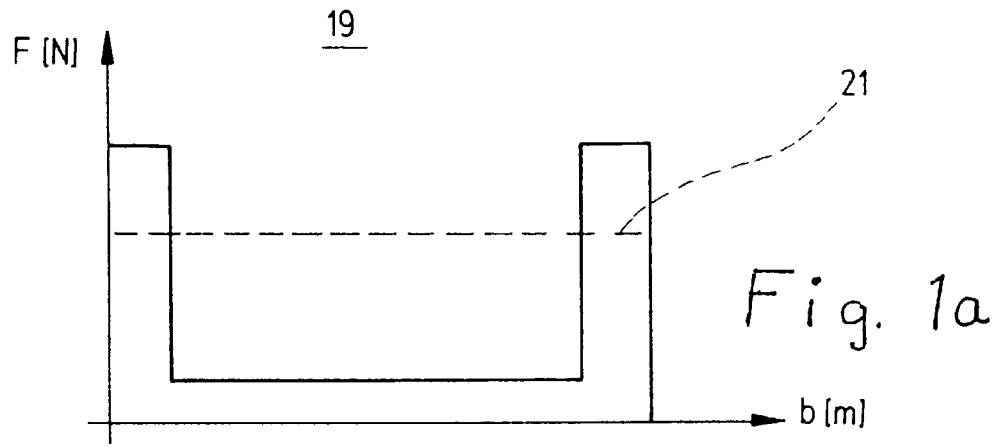
FIG. 1a is force diagram of forces acting across the width of the belt of FIG. 1.
Figure 1:
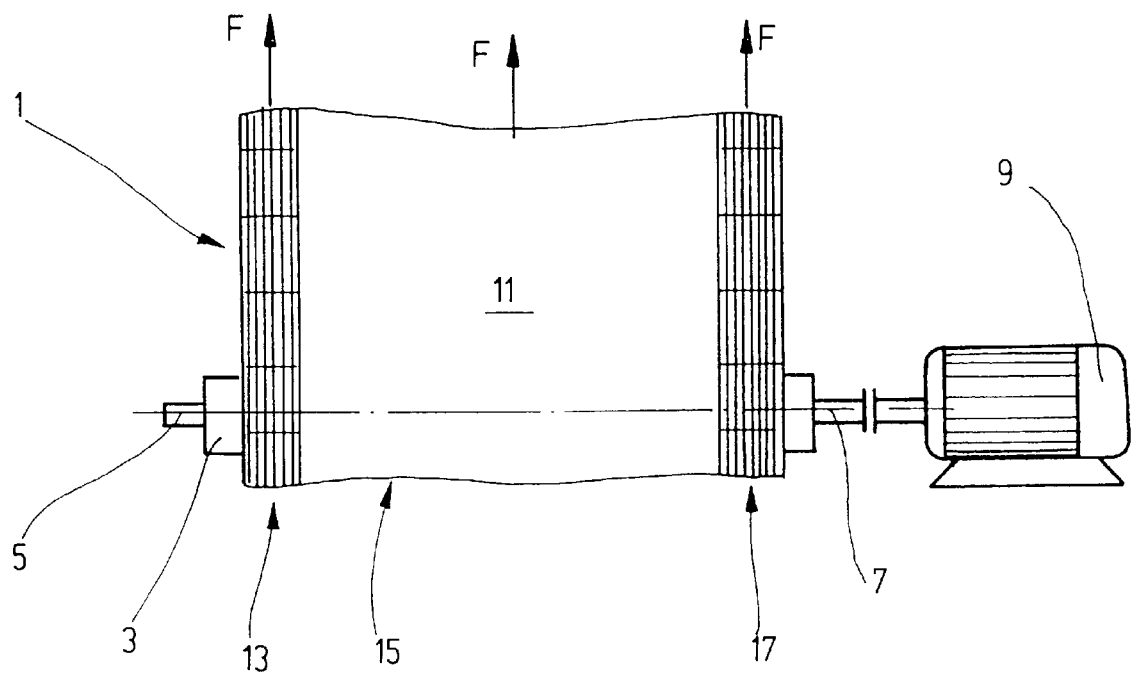
FIG. 1 is a partial view of a machine for producing a continuous material web, and a belt for use in such a machine, respectively.

FIG. 1 shows a segment of a machine 1 for producing a material web, namely a roll 3, which is provided at its ends with axle journals 5 and 7. These axle journals cooperate with bearing devices, not shown here. A drive device, in this case an electric motor 9 provides drive torque to roll 3 and engages the right axle journal 7. The electric motor 9 is disposed on the so-called off side of machine 1.

A belt 11 is guided via roll 3. The belt can be a (drying) screen or a felt. Generally, it may also be referred to as a drying belt, with which the material web (not shown here) is guided via roll 3 and through paper machine 1.

Belt 11 is characterized by three zones 13, 15 and 17. The two edge zones 13 and 17 serve to transmit drive forces exerted by roll 3. Their properties differ from those of center zone 15. In principle, it is possible to omit one of the two edge zones 13 or 17.

Machine 1 or belt 11 is designed such that edge zones 13 and 17 are structured to transmit the drive forces. For this purpose, it is provided that the edge zones possess tremendous tensile strength; that is, they have a large modulus of elasticity. If, for example, a fabric belt 11 is used, or a belt whose edge zones comprise fabric, considerably more threads, fibers, or the like are provided to extend in the traveling direction than in the transverse direction.

The width of belt 11 is selected such that zones 13 and 17 have practically no contact with the material web guided inside machine 1 or, at most, touch its edge regions. It is therefore possible to use materials for zones 13 and 17 that are not adapted to the production of the material web. It is apparent from the drawing that center zone 15 is significantly wider than edge zones 13 and 17.

Center zone 15 of belt 11 is preferably adapted to the production of the material web. For example, a fine surface shape that is free of marks can be provided on the side facing the material web, for example a paper web. Belts 11, in the center zone 15 associated with the paper web, which possess water-absorbent properties are particularly preferred in the region of the press section of a paper-producing machine. Water-permeable properties of zone 15 are preferred in the screen section, or in the region of the former. Belts 11 whose zone 15 is air- and water-permeable are preferred in the drying section; this permits an optimal drying of the material web or paper. Finally, in belts 11 used as conveyor belts, it is preferred that zone 15 be flexible and absorb as little water as possible. Because no drive forces, or at least virtually no drive forces, must be transmitted in this center zone 15, belt 11 can be completely, or at least extensively, adapted to these requirements in the region of this zone.

Correspondingly, to reiterate, the edge regions, that is, zones 13 and 17, are designed such that they practically completely take up the drive forces.

In the representation of FIG. 1, belt 11 is embodied in one piece; in other words, zones 13, 15 and 17 are integral components of belt 11. It is also possible, however, to embody edge zones 13 and 17 separately from center zone 15.

FIG. 1a shows a diagram 19 above the representation of machine 1, the diagram showing the forces F acting in belt 11 over the width b of belt 11. It is readily apparent that the forces acting in the direction of movement of belt 11 are significantly greater in the region of edge zones 13 and 17 than in center zone 15. It is advantageous if small forces are also active here, so that belt 11 is not misaligned as it passes through machine 1.

A dashed line 21 indicates that the forces acting in belt 11 are active approximately horizontally in a conventional machine belt 11 which does not include any of the zones described here. This means that, in such belts or machines, the drive forces are distributed more or less uniformly over the width of the belt.

Figure 2:
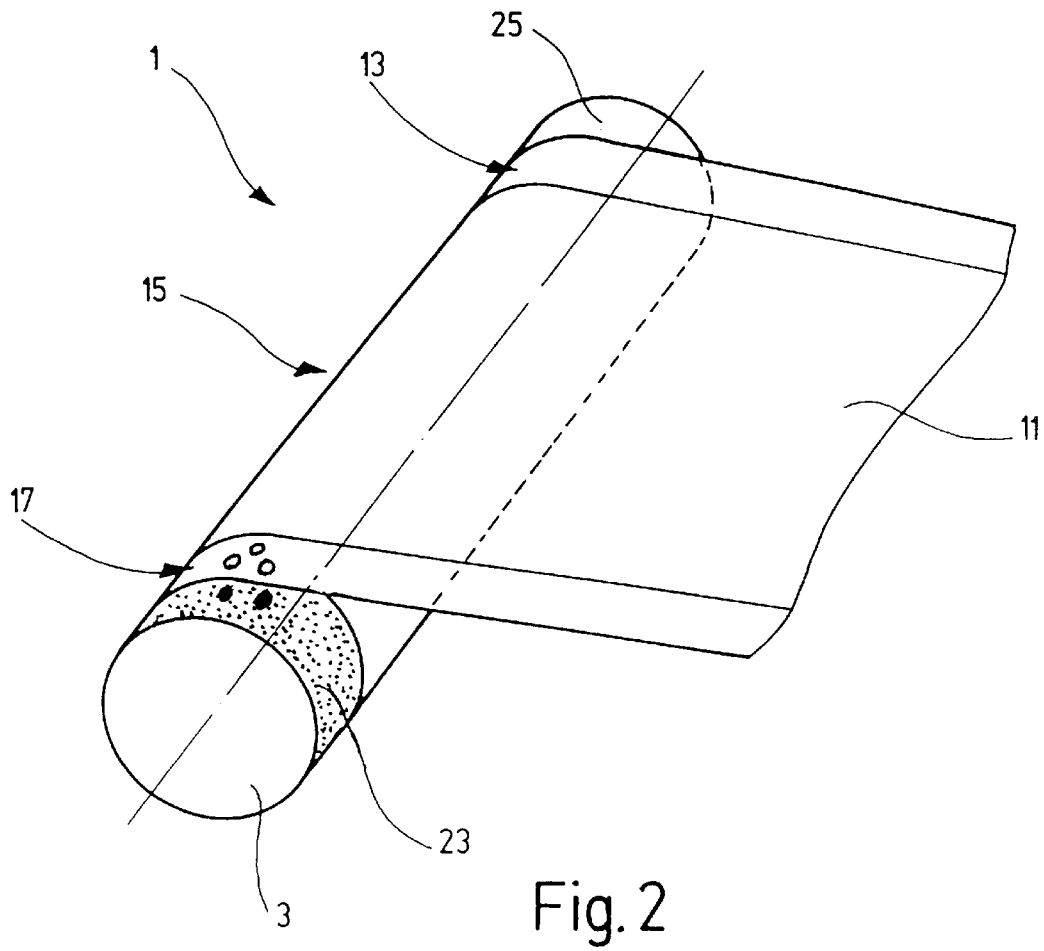
FIG. 2 is a first, modified embodiment of a machine and a belt, respectively, according to FIG. 1.

FIG. 2 also shows a segment of a machine 1 for producing a material web, particularly a paper or cardboard web. It is apparent from the outline that the edge region 23 of roll 3, whose axle journals are not shown here for the sake of a clear overview, is specially adapted to the edge region 17 of belt 11. It is possible, for example, to embody the surface in this edge region 23 such that a very high coefficient of friction is established. At the same time, the highest possible wear resistance is preferably provided.

At the same time, it is also preferably provided that the surface of edge zone 17 that touches edge region 23 of belt 11 is likewise such that a high coefficient of friction results, with minimum wear.

It is also conceivable to produce a partial form closure between zone 17 of belt 11 and edge region 23 of roll 3 by providing the two sides with depressions and projections that cooperate with one another, such as in a toothed belt.

Finally, it also is feasible to design the opposite edge region 25 of roll 3 similarly to edge region 23, that is, to provide the surface with a high coefficient of friction, whereby a high resistance to wear should be ensured at the same time. It is conceivable to also provide the surface of zone 13 that faces edge region 25 with such a surface shape, or, as in this case, to ensure a form closure with projections and depressions.

Roughening both belt 11 in zones 13 and 17 and roll 3 in edge regions 23 and 25 can result in a particularly good transmission of the drive forces in the area of these zones and edge regions.

Suitable pairing of materials for edge regions 23, 25 and the surfaces of zones 13 and 17 facing these regions can ensure that large drive forces can be transmitted.

Because this embodiment is limited to edge zones 13 and 17, or edge regions 23 and 25, only small drive forces are introduced into center zone 15 of belt 11.

Figure 3:
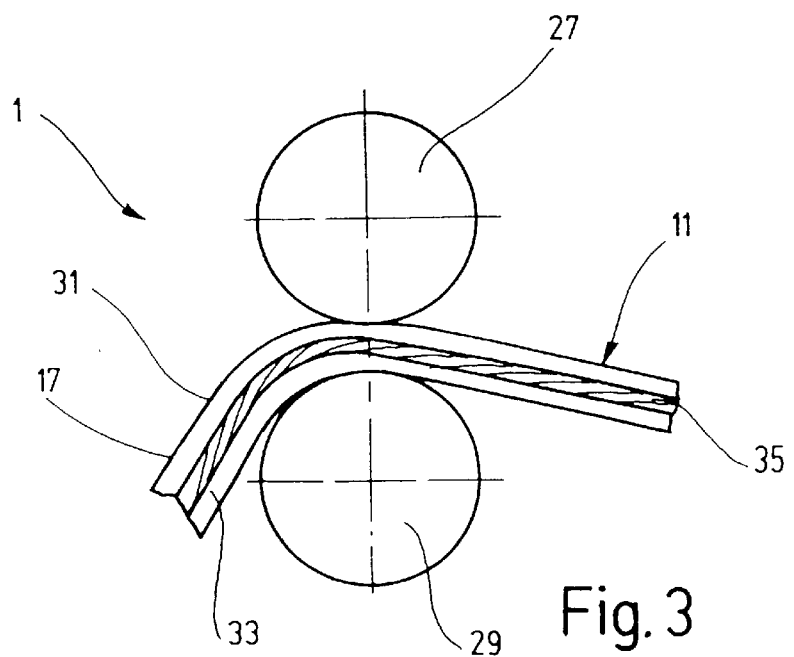
FIG. 3 is a schematic illustration of a modified embodiment of a machine and belt, respectively, of FIG. 1.

FIG. 3 also shows a segment of a machine 1 for producing a material web, particularly a paper or cardboard web, namely a so-called press nip, which is formed by two press rolls 27 and 29. Zone 17 of belt 11, shown here in a side view, has two outer layers 31 and 33, between which a center layer 35 is sandwiched. The outer layers are more elastic than the center layer and, in connection with the surfaces of press rolls 27, 29, result in a high coefficient of friction, so that large drive forces can be transmitted. The center layer 35 possesses the highest possible tensile strength, and is preferably in the range of neutral fibers for bending requirements, so wear is reduced to a minimum.

Like the roll 3 explained in conjunction with FIG. 2 or its edge regions 23 and 25, the edge regions of press rolls 27 and 29 that are associated with zone 17 can be designed so as to result in a particularly good transmission of the drive forces.

Belt 11 is preferably provided with two edge zones, that is, with a zone 13 that is located opposite to zone 17 and has an equivalent design, and likewise serves to transmit drive forces. Again, belt 11 is preferably designed such that the width of center zone 15 is adapted to the width of the material web and such that edge zones 13 and 17 do not touch the material web, so the web is not adversely affected.

Figure 4:
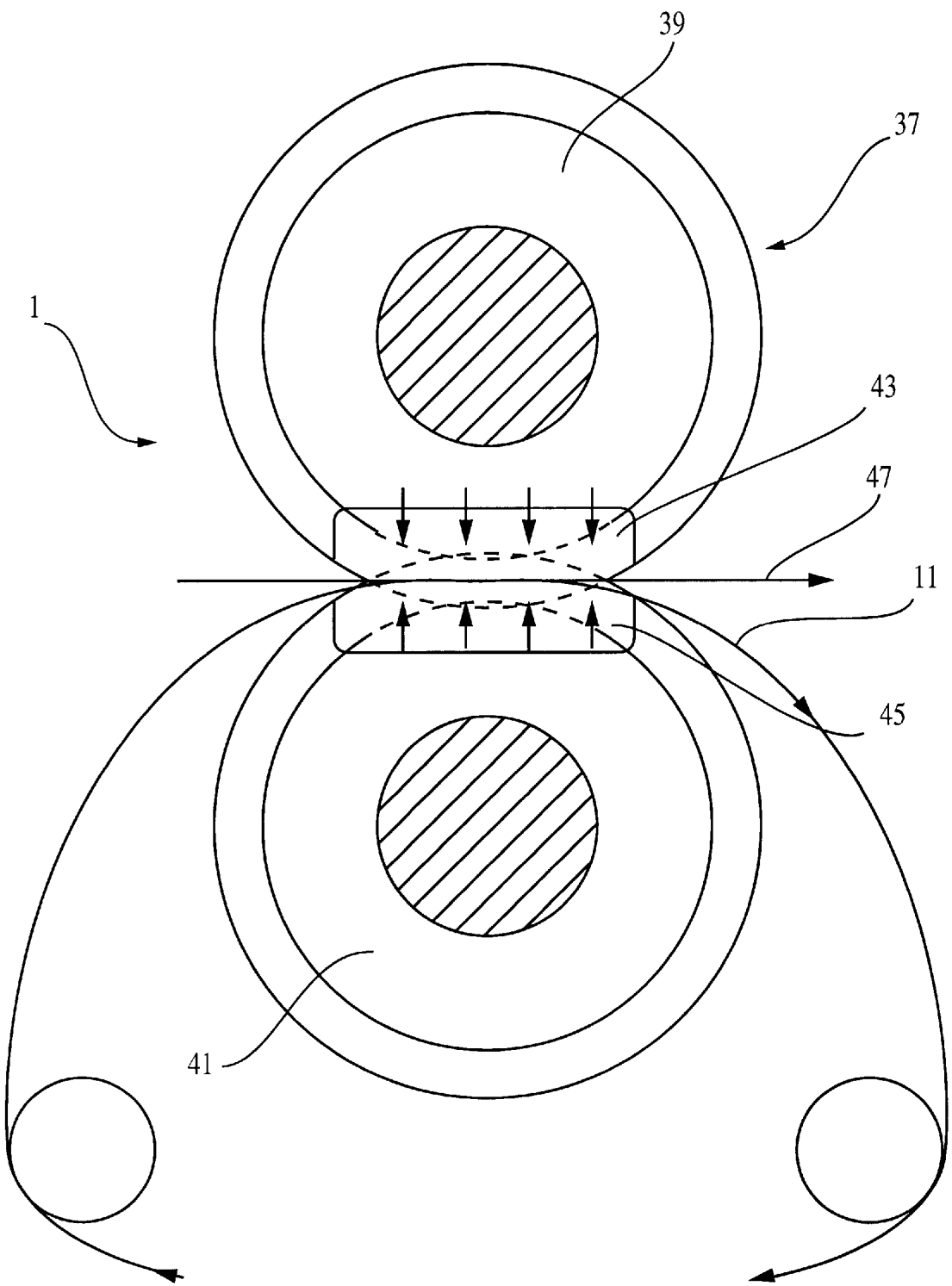
FIG. 4 is a schematic illustration of a portion of a machine for producing a material web, specifically a shoe press, and a belt.

FIG. 4 shows a fundamental outline, in a side view, of a part of a machine 1, namely a so-called shoe press 37, which comprises two press rolls 39 and 41, and two press shoes 43 and 45. The material web 47 is guided with a belt 11 between the press shoes.

In this case as well, belt 11 is provided with two or three zones, namely a zone assigned to the material web, and one or two edge zones, as described in conjunction with the foregoing figures.

Overall, it is evident that belt 11 can be used in very different ways, particularly in connection with machines for producing a material web, such as a paper web or cardboard.

A feature of the invention is that edge zones 13 and 17 of belt 11 are designed such that they can transmit drive forces that have been introduced into a roll 3 by way of an electric motor 9. In this way, the drive forces exerted on roll 3 can be transmitted by belt 11 to further rolls of machine 1. This simplifies the machine operation considerably, and can be realized at low cost. Because toothed wheels, transmission belts or the like can be omitted, the noise level of this type of machine is greatly reduced with the use of a belt 11 of the type described here. Control and/or regulating devices for synchronizing the roll rotation can be omitted. Edge zones 13 and 17 are preferably designed such that a high coefficient of friction is formed between belt 11 and the driven rolls. Ultimately, it is inconsequential which type of rolls cooperate with belt 11. It is therefore also possible to transmit drive forces between press rolls and the belt, that is, to transmit drive forces exerted by press rolls to subsequent rolls of a machine 1.

The transmission of the drive forces can be promoted through a special material pairing between the belt and roll, but also through a special design of the surfaces of edge zones 13 and 15 and the associated edge regions 23 and 27 of a roll 3, whereby a form closure in the sense of a toothed belt is also conceivable. In all cases, the special design of the edge zones for the transmission of the drive forces is independent of the design of the center zone 15, on which the material web lies.

It is especially advantageous that belt 11 can also be installed into existing machines 1, which can simplify the machine drive. It is therefore possible to retrofit existing machines and, in association with this retrofitting, to simplify the machine with respect to its drive.

Because edge zones 13 and 17 are specially designed for transmitting drive forces, and possess high tensile strength, belt 11 is only expanded—if at all—to the least possible degree during machine operation, practically precluding an expansion of the material web or relative movements between belt 11 and the material web. It is thus simple to significantly improve the quality properties of the material web.

Finally, it has also been seen that a highly-effective force transmission is attained in machine 1 through the use of belt 11, so that even loosely-wrapped rolls can be driven effectively, because sufficiently-large drive forces are active. The drive power is transmitted to all of the rolls with the aid of belt 11, which minimizes slip and differences in rpm. The load of zone 15 of belt 11 supporting the material web is therefore eased.

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed is:

1. A machine for producing a continuous material web, comprising:
    at least one belt;
    a number of rolls, around which the material web is guided with the at least one belt;
    wherein the belt comprises at least two zones, which have different properties;
    wherein at least one of the zones is structured and arranged to transmit drive forces to the rolls;
    wherein the at least one zone to transmit drive forces has a higher tensile strength than the other at least one zone;
    wherein the at least one zone to transmit drive forces is located outside of a region in which the material web contacts the belt; and
    wherein the belt comprises a fabric in which, in the zone to transmit drive forces contains, substantially more threads/fibers extending in a run direction of the belt than in a transverse direction of the belt.

2. A machine in accordance with claim 1, wherein the zone that transmits drive forces is at an edge region of the belt.

3. A machine in accordance with claim 1, wherein the belt includes three zones of which two edge zones transmit drive forces.

4. A machine in accordance with claim 1, wherein the zone to transmit drive forces is comprised of a material possessing high tensile strength.

5. A machine in accordance with claim 1, wherein at least one surface of the zone to transmit drive forces comprises a material possessing a high coefficient of friction.

6. A machine in accordance with claim 1, wherein surfaces of the rolls which cooperate with the zone to transmit drive forces, comprise, at least in some regions, a material possessing a high coefficient of friction.

7. A machine in accordance with claim 1, wherein the zone to transmit drive forces is one of a roughened zone and a zone provided with projections/depressions that cooperate with depressions/projections provided on the rolls.

8. A machine in accordance with claim 1, wherein the zone to transmit drive forces is separate from a center zone of the belt.

9. A machine in accordance with claim 1, wherein the material web is a paper web.

10. A machine in accordance with claim 1, wherein the material web is a cardboard web.

11. A belt for a material web producing machine that includes a number of rolls, comprising:
    at least two zones arranged across a width of the belt;
    the at least two zones being structured to have different properties;
    at least one of the two zones being adapted to transmit drive forces to the rolls, wherein the at least one zone to transmit drive forces has a higher tensile strength than the other at least one zone;
    the at least two zones being arranged so that the at least one zone to transmit drive forces is located outside of a region adapted to contact the material web;
    wherein the belt is a fabric belt which, in the zone to transmit drive forces, contains substantially more threads/fibers extending in a run direction of the belt than in a transverse direction of the belt.

12. A belt in accordance with claim 11, wherein the zone for transmission of drive forces is located at an edge of the belt.

13. A belt in accordance with claim 11, wherein the belt has three zones of which two edge zones are provided for transmitting drive forces.

14. A belt in accordance with claim 11, wherein the zone to transmit drive forces comprises a material possessing a high tensile strength.

15. A belt in accordance with claim 11, wherein at cast one surface of the zone to transmit drive forces comprises a material possessinig a high coefficient of friction.

16. A belt in accordance with claim 11, wherein surfaces of the rolls, which cooperate with the zone to transmit drive forces, comprise, at least in some regions, a material possessing a high coefficient of friction.

17. A belt in accordance with claim 11, wherein the zone to transmit drive forces is one of roughened zones and zones equipped with projections/depressions capable of cooperating with depressions/projections on the rolls.

18. A belt in accordance with claim 11, wherein the zone to transmit drive forces is constructed separately from a center zone of the belt (11).

19. A belt in accordance with claim 11, wherein the belt is a screen belt.

20. A belt in accordance with claim 11, wherein the belt is a felt.

21. A belt in accordance with claim 11, wherein the belt is a drying sieve.

22. A belt in accordance with claim 11, wherein the belt is a press jacket.

23. A belt in accordance with claim 11, wherein the material web is a paper web.

24. A belt in accordance with claim 11, wherein the material web is a cardboard web.

* * * * *